United States Patent
Umezawa et al.

(10) Patent No.: US 10,092,027 B2
(45) Date of Patent: Oct. 9, 2018

(54) LOW-PH SOY SAUCE

(71) Applicant: KIKKOMAN CORPORATION, Noda-shi (JP)

(72) Inventors: Hiroki Umezawa, Chiba (JP); Takanobu Owaki, Chiba (JP)

(73) Assignee: KIKKOMAN CORPORATION, Noda-shi (JP)

( * ) Notice: Subject to any disclaimer, the term of this patent is extended or adjusted under 35 U.S.C. 154(b) by 0 days.

(21) Appl. No.: 15/129,472

(22) PCT Filed: Oct. 14, 2015

(86) PCT No.: PCT/JP2015/078994
§ 371 (c)(1),
(2) Date: Sep. 27, 2016

(87) PCT Pub. No.: WO2016/060149
PCT Pub. Date: Apr. 21, 2016

(65) Prior Publication Data
US 2017/0172192 A1    Jun. 22, 2017

(30) Foreign Application Priority Data
Oct. 14, 2014 (JP) .................... 2014-210076

(51) Int. Cl.
*A23L 27/50* (2016.01)
*A23L 23/00* (2016.01)

(52) U.S. Cl.
CPC .............. *A23L 27/50* (2016.08); *A23L 23/00* (2016.08)

(58) Field of Classification Search
None
See application file for complete search history.

(56) References Cited

U.S. PATENT DOCUMENTS

| | | | |
|---|---|---|---|
| 9,107,437 B2 | 8/2015 | Endo et al. | |
| 2009/0162479 A1* | 6/2009 | Nakatoh | A23L 27/50 426/46 |
| 2014/0004225 A1 | 1/2014 | Akamatsu et al. | |

FOREIGN PATENT DOCUMENTS

| | | |
|---|---|---|
| JP | 53-118596 A | 10/1978 |
| JP | 53-118597 A | 10/1978 |
| JP | 7-31412 A | 2/1995 |
| WO | 2011/034049 A1 | 3/2011 |
| WO | 2012/128290 A1 | 9/2012 |

OTHER PUBLICATIONS

Encyclopedia of Brewing, Asakura Publishing Co., Ltd., pp. 412-420 (1988).
Nobutake Nunomura, et al., "Identification of Volatile Components in Shoyu (Soy Sauce) by Gas Chromatography-Mass Spectrometry," Agr. Biol. Chem., vol. 40, No. 3, 1976, pp. 485-490.
International Search Report dated Jan. 19, 2016 in PCT/JP2015/078994 filed Oct. 14, 2015.

* cited by examiner

*Primary Examiner* — Elizabeth A Gwartney
(74) *Attorney, Agent, or Firm* — Oblon, McClelland, Maier & Neustadt, L.L.P.

(57) ABSTRACT

The object of the present invention is to provide a soy sauce with a pH of less than 4.6, which has reduced acidic taste and acidic odor and improved umami in the aftertaste. The soy sauce with a pH of less than 4.6, which has reduced acidic taste and acidic odor and improved umami in the aftertaste can be obtained by adjusting the ethyl lactate concentration per 1 w/v % of total nitrogen concentration in the soy sauce to 20 ppm or more.

4 Claims, No Drawings

LOW-PH SOY SAUCE

TECHNICAL FIELD

The present invention relates to a low-pH soy sauce that has a reduced acidic taste and acidic odor as well as improved umami in the aftertaste.

BACKGROUND ART

Soy sauce, which is a traditional Japanese condiment, is produced by the following steps when conducting authentic brewing: inoculating a koji mold into a mixture of heat-denatured protein material such as soybeans and starch material such as wheat and performing culture so as to prepare soy sauce koji, adding the soy sauce koji to an aqueous common salt solution so as to prepare soy sauce moromi (i.e., moromi-mash), fermenting and maturing the soy sauce moromi, and press-filtering the soy sauce moromi. The pH of brewed soy sauce obtained by such an ordinary production method is about 4.8. In addition, since soy sauce has buffering capacity over a wide pH range, if soy sauce is added to a condiment with a pH of less than 4.6, for example, the resulting pH might exceed 4.6.

The pH of a food influences the taste and flavor of the food. It is also strongly associated with the proliferation of microorganisms. In general, if the pH of a food is reduced, proliferation of microorganisms can be suppressed, thereby preventing decay or deterioration of the food. Therefore, it would be useful to reduce pH in order to increase the resistance of a food to microorganisms.

For example, a method that involves adding an acidulant is used to reduce the pH of soy sauce. However, if pH is reduced by this method, an acidic taste and acidic odor are strongly sensed, which in turn results in poor umami in the aftertaste of soy sauce. This is not preferable in terms of flavor. Therefore, if it becomes possible to provide a low-pH soy sauce having reduced acidic taste and acidic odor and good flavor, it would be very useful for achieving microorganism resistance and satisfying taste preferences.

Meanwhile, it is known that soy sauce contains various aromatic components that constitute its rich aroma. These components are combined with each other in a complex manner to result in the unique odor of soy sauce. Ethyl lactate is known as an aromatic component of soy sauce (Non-Patent Document 1). However, it has heretofore been completely unknown that ethyl lactate has effects of intensifying umami, reducing acidic taste and acidic odor, and improving the flavor for a soy sauce with a pH of less than 4.6, which is lower than the pH of conventional soy sauce.

PRIOR ART DOCUMENTS

Non-Patent Documents

[Non-Patent Document 1] N. Nunomura, M. Sasaki, Y. Asao, and T. Yokotsuka: Agr. Biol. Chem., 40 (3), pp. 485-490 (1976)

SUMMARY OF INVENTION

Problems to be Solved by the Invention

The object of the present invention is to provide a soy sauce with a pH of less than 4.6, which has reduced acidic taste and acidic odor and improved umami in the aftertaste.

Means for Solving the Problem

As a result of intensive studies to achieve the above object, the present inventors discovered that by allowing a soy sauce with a pH of less than 4.6 to contain 20 ppm of ethyl lactate per 1 w/v % of total nitrogen concentration in the soy sauce, it becomes possible to reduce acidic taste and acidic odor, thereby improving umami in the aftertaste. This has led to the completion of the present invention.

Specifically, the present invention encompasses the following inventions.

(1) A soy sauce containing ethyl lactate at a concentration of 20 ppm or more per 1 w/v % of total nitrogen concentration in the soy sauce and having a pH of less than 4.6.
(2) The soy sauce according to (1), wherein the ethyl lactate concentration is 70 ppm or less.
(3) The soy sauce according to (1), wherein the pH is more than 4.2.
(4) The soy sauce according to (1), having a common salt concentration of 12 to 18 w/v %.

This description includes part or all of the content as disclosed in the description and/or drawings of Japanese Patent Application No. 2014-210076 filed on Oct. 14, 2014, which is a priority document of the present application.

Effects of the Invention

The low-pH soy sauce of the present invention has reduced acidic taste and acidic odor and improved umami in the aftertaste, although it is a soy sauce with a pH of less than 4.6.

Embodiments For Carrying Out The Invention

Hereafter, the present invention will be described in detail.

The low-pH soy sauce of the present invention is characterized in that it has a pH of less than 4.6, and it contains ethyl lactate at a concentration of 20 ppm or more per 1 w/v% of total nitrogen concentration in the soy sauce. The pH of the low-pH soy sauce of the present invention may be less than 4.6, a level at which proliferation of microorganisms can be suppressed. However, in view of maintenance of the original soy sauce flavor, the lower limit of the pH is preferably more than 4.2 and more preferably 4.4 or more. According to the present invention, pH can be adjusted by a method comprising controlling fermentation of microorganisms during brewing, a method comprising adding a pH adjuster such as an acidulant, or the like, and such methods are not particularly limited. However, for example, an acidulant can be added to moromi (moromi before maturation or moromi after maturation and before press-filtration), press-filtrated liquid after moromi maturation, or a soy sauce obtained as a commercial product. The acidulant is not particularly limited as long as it can be used for foods. Examples thereof include: organic acids such as lactic acid, citric acid, acetic acid, tartaric acid, and malic acid; and inorganic acids such as phosphoric acid and hydrochloric acid. Lactic acid or acetic acid is preferable in consideration of the fact that it is unlikely to affect taste or flavor. In addition, such acidulants can be used alone or in combinations of two or more types.

In addition, the ethyl lactate concentration per 1 w/v % of total nitrogen concentration in soy sauce should be 20 ppm or more for the low-pH soy sauce of the present invention. In view of reduction of acidic taste and acidic odor and improvement of soy sauce umami and especially umami in the aftertaste, the concentration is preferably 20 ppm to 70 ppm, more preferably 20 ppm to 50 ppm, and further preferably 20 ppm to 30 ppm. If the ethyl lactate concentration per 1 w/v % of total nitrogen concentration in soy sauce is less than 20 ppm, the effects of reducing acidic taste and acidic odor and improving umami in the aftertaste cannot be obtained. In addition, if it exceeds 70 ppm, a medicinal odor (peppermint-like odor) that is particular to ethyl lactate is intensified, which is not preferable. The ethyl lactate concentration per 1 w/v % of total nitrogen concentration in soy sauce can be determined in accordance with an ordinary method using, for example, gas chromatography.

In the low-pH soy sauce of the present invention, as long as the ethyl lactate concentration per 1 w/v % of total nitrogen concentration in soy sauce falls within the above range, the way in which the concentration is adjusted is not particularly limited. For example, it can be adjusted by controlling fermentation or adding commercially available ethyl lactate. Ethyl lactate can be added to, for example, moromi (moromi before maturation or moromi after maturation and before press-filtration), press-filtrated liquid after moromi maturation, or soy sauce obtained as a commercial product.

The soy sauce of the present invention may be any type of soy sauce. Examples thereof include koikuchi (dark-colored) soy sauce, usukuchi (light-colored) soy sauce, tamari (rich-tasting) soy sauce, saishikomi (refermented) soy sauce, and white soy sauce. Also, soy sauce undergoing processing, raw soy sauce, and kiage (unpasteurized) soy sauce are included.

The term "umami" (pleasant savory taste), which is improved for the low-pH soy sauce of the present invention, refers to a taste sensed with the presence of umami components such as glutamic acid. When tasting a food, the initial taste and the aftertaste can be sensed in such order over time. The term used herein means umami in the aftertaste. The concepts of the initial taste and the aftertaste are relatively defined, and thus they cannot be clearly defined based on the relationship between time and the type or flavor components of a food. However, according to the present invention, the initial taste is a taste sensed between 0 and 2 seconds after tasting and the aftertaste is a taste sensed at least 5 seconds after tasting.

The low-pH soy sauce of the present invention can be produced by an ordinary method for producing a soy sauce including the following steps, in addition to the adjustment of pH and the ethyl lactate concentration described above: a step of preparing soy sauce koji, a step of preparing soy sauce moromi (mixing of soy sauce koji and an aqueous common salt solution), a step of fermenting and maturing soy sauce moromi, and a step of squeezing soy sauce moromi.

(Preparation of Soy Sauce Koji)

First, a soy sauce koji is prepared in accordance with a usual process for producing a brewed soy sauce in the following manner. Specifically, a heat-denatured protein raw material such as soybeans, defatted soybeans, and wheat gluten and heat-denatured starch raw materials such as mugis (wheat, barley, rye, and adlay) and rices are mixed. The moisture content of the mixture is adjusted to 35 to 45 w/v%. Then, seed koji mold such as *Aspergillus sojae* or *Aspergillus oryzae* is inoculated therein and cultured at 20° C. to 40° C. for 3 to 4 days so as to prepare soy sauce koji (koji-making). The heat denaturation of mugis is preferably performed by roasting and milling, while the heat denaturation of rices is preferably performed by steam-boiling or cooking with a rice cooker.

In general, the blend ratio of the protein raw material to the starch raw material (the protein raw material : the starch raw material) is, but is not particularly limited to, 100:0 to 0:100 in terms of the volume ratio. However, the blend ratio is, for example, preferably 30:70 to 70:30 and more preferably 40:60 to 60:40, as in the cases of koikuchi soy sauce and usukuchi soy sauce.

(Preparation of Soy Sauce Moromi)

Next, soy sauce moromi is prepared. Soy sauce moromi is obtained by mixing soy sauce koji and an aqueous common salt solution (referred to as "shikomi" (preparing soy sauce moromi mash)). Here, the amount of an aqueous common salt solution to be mixed in is determined so that it will account for preferably 100 to 300 v/v % of the volume of plant seeds (in terms of the volume of fresh seeds) used for the preparation of the soy sauce koji.

The common salt concentration of an aqueous common salt solution used in the present invention is preferably 13.0 to 20.0 w/v % and more preferably 14.0 to 18.0 w/v % when soy sauce moromi prepared by mixing soy sauce koji with the aqueous common salt solution is squeezed. If the common salt concentration is less than 13.0 w/v %, soy sauce moromi decays, although this depends on the season. This is not preferable. Meanwhile, if it is more than 20.0 w/v %, proliferation of yeast cells is prevented, which is not preferable. In addition, the common salt concentration of a soy sauce obtained by press-filtering fermented mature soy sauce moromi prepared as a final product is adjusted so as to prepare a commercial product. The common salt concentration of a commercial product of the soy sauce of the present invention is preferably 12.0 to 18.0 w/v % and more preferably 12.0 to 16.0 w/v %, so that the excellent effects of ethyl lactate for improving umami in the aftertaste can be obtained.

(Fermentation and Maturation of Soy Sauce Moromi)

Next, the obtained soy sauce moromi is fermented and matured. Fermentation and maturation may be carried out in one or two stages. When fermentation and maturation are carried out in two stages, either soy sauce koji (referred to as "additional koji" in some cases) alone or a combination of soy sauce koji and an aqueous common salt solution (referred to as "additional moromi" in some cases) is added to the first stage moromi during the first-stage fermentation and maturation; that is to say, before the completion of fermentation and maturation so that the second stage moromi is obtained, and then fermentation and maturation are further carried out.

In addition to alcohol fermentation, it is preferable to carry out lactic acid fermentation for fermentation and maturation of soy sauce moromi. In general, lactic acid fermentation is carried out before or during alcohol fermentation for soy sauce brewing. Examples of lactic acid bacteria that can be used for lactic acid fermentation include salt-tolerant soy sauce lactic acid bacteria such as *Tetragenococcus halophilus*.

Lactic acid fermentation is carried out by adding lactic acid bacteria to soy sauce moromi so as to result in $1\times10^3$ to $1\times10^7$ cells per gram of moromi and maintaining the moromi temperature at 15° C. to 35° C. for a sufficient period of time, such as 30 to 60 days, during which pH can reach 4.6 to 5.3. It is preferable to carry out lactic acid fermentation until the concentration of lactic acid generated in soy sauce moromi reaches 0.5 w/v % or more.

The pH of the soy sauce moromi at the start of lactic acid fermentation is usually 5.8 to 6.2. Soy sauce moromi is gradually dissolved (hydrolyzed) to trigger the elution of raw materials and lactic acid fermentation, which results in a decrease in the pH of moromi to 4.6 to 5.3. Then, the soy sauce moromi would be suitable for the proliferation of yeast cells.

The timing of adding soy sauce yeast is not limited. However, in order to avoid premature fermentation, the soy sauce yeast is preferably added after the completion of lactic acid fermentation, that is, at the time when the pH of moromi decreases to 5.3 or less.

Preferably, yeast used for alcohol fermentation in the present invention is salt-resistant soy sauce yeast that can actively proliferate even in soy sauce moromi with a high common salt concentration of 10 to 20 w/w %. Examples thereof include: yeasts of the genus *Zygosaccharomyces* such as *Zygosaccharomyces rouxii* and *Zygosaccharomyces bailli*; and yeasts of the genus *Candida* such as *Candida versatilus, Candida etchellsii*, and *Candida tropicalis*.

It is preferable to add the yeast described above, which has been preliminarily cultured, to soy sauce moromi at a concentration of $1 \times 10^3$ to $1 \times 10^7$ cells per gram of moromi. Alternatively, it is also possible to use yeast that has naturally fallen from the air into soy sauce moromi or has become naturally mixed in with soy sauce koji or salt-tolerant soy sauce yeast (wild-type yeast) that resides in a fermenter to which soy sauce moromi has been added, without manually adding the above preliminarily cultured yeast.

Alcohol fermentation is carried out by maintaining the moromi temperature at 20° C. to 35° C. for a sufficient period of time, such as 30 to 90 days, during which the alcohol concentration can reach about 0.5 to 4 v/v % and preferably about 3 to 4 v/v %, after the addition of yeast. The ethyl alcohol concentration in moromi can be adjusted depending on the culture time. It is preferable to carry out fermentation and maturation of yeast cells intermittently or continuously under aerobic conditions involving aeration culture, agitation culture, aeration agitation culture, or the like.

After the completion of alcohol fermentation, the soy sauce moromi is further allowed to stand still to continue fermentation with yeast/lactic acid bacteria, followed by maturation. The extent of maturation is not specifically determined; however, maturation is usually carried out for several months.

(Squeezing and Pasteurization)

Soy sauce can be obtained by press-filtering mature soy sauce moromi using an ordinary method. For press filtration, a conventionally known method can be used, such method involving an atsuage technique comprising wrapping moromi with filter cloth made of synthetic fibers such as nylon and pressurizing it, a filter-press technique comprising placing moromi on a filter cloth attached to both a filter plate and a squeezing plate and pressurizing moromi using, for example, compressed air, or the like. The obtained soy sauce is sterilized or disinfected. The method of sterilization or disinfection is not limited. However, in general, the form of heat treatment known as "hiire" (pasteurization) is carried out for sterilization, followed by sedimentation (clarification). Then, soy sauce is introduced into containers to prepare commercial products. Pasteurization may be carried out under heating conditions used in known soy sauce brewing. For example, pasteurization is carried out at 80° C. to 85° C. for 20 to 60 minutes or at 110° C. to 120° C. for 5 to 20 seconds. For sedimentation (clarification), a conventionally known method involving membrane treatment, diatomaceous earth filtration, centrifugal separation, coagulation, precipitation, or the like can be used.

The low-pH soy sauce of the present invention can be directly used or used in liquid form. Alternatively, it may be dried by an ordinary method such as freeze drying, spray drying, or drum drying so that it is prepared in the paste, solid, or powder form. The low-pH soy sauce of the present invention in such form can be added to liquid condiments such as a variety of soup bases (e.g., noodle soup bases), sauces (e.g., barbeque sauces), ponzu (citrus-based) sauces, dressings, and soups so as to be used as a soy-sauce-containing condiment.

EXAMPLES

The present invention will be further specifically described below with reference to the Examples. However, the present invention is not limited to the Examples.

Reference Example

Method for Assaying Components

In the Examples below, the ethyl lactate concentration in a sample was analyzed using the method of "5-5: Quantitative determination of odor components by gas chromatography" in accordance with the "Experimental Method for Soy Sauce" (edited by The Japan Soy Sauce Inspection Institute, issued on Mar 1, 1985, pp. 177 to 179).

Example 1

Effects of Ethyl Lactate for Improving Umami

Acetic acid was added to a commercially available koikuchi soy sauce (Kikkoman Corporation; pH 4.8; ethyl lactate concentration per 1 w/v % of total nitrogen concentration: 12 ppm; common salt concentration: 16.0 w/v %) so that a soy sauce with pH 4.6 (control product) and a soy sauce with pH 4.5 (test product 1-1) were separately prepared. A commercially available ethyl lactate (Tokyo Chemical Industry Co., Ltd.) was added to the test product 1-1 such that the ethyl lactate concentration per 1 w/v % of total nitrogen concentration was adjusted to 30 ppm. Thus, test product 1-2 was obtained.

The test products and the control product obtained above were subjected to sensory evaluation. The sensory evaluation of "umami in the aftertaste" sensed at least 5 seconds after tasting was performed by 6 panelists who had been trained to have the ability to distinguish such taste. The sensory evaluation results were ranked using points. Points (3 points, 2 points, and 1 point) were given in descending order of the intensity of umami. The results were expressed as the sum of the points. For ranking, the Tukey-Kramer (significant difference) method was used. Table 1 shows the results.

TABLE 1

| Category | pH | Total nitrogen concentration (w/v %) | Ethyl lactate concentration per 1 w/v % of total nitrogen concentration (ppm) | Intensity of umami in the aftertaste |
|---|---|---|---|---|
| Test product 1-1 | 4.5 | 1.6 | 12 | 6* |
| Control product 1 | 4.6 | 1.6 | 12 | 14 |
| Test product 1-2 (Present invention product) | 4.5 | 1.6 | 30 | 16 |

*"Significant different" at a significance level of 5%

The results for the control product 1 (pH 4.6) and the test product 1-1 (pH 4.5) revealed that the umami in the aftertaste would be remarkably weakened with a decrease in pH for soy sauce with a pH of less than 4.6. Meanwhile, in the case of the test product 1-2 (the present invention product) with pH 4.5, which contained ethyl lactate at a concentration of 30 ppm per 1 w/v % of total nitrogen concentration, the umami in the aftertaste was significantly stronger than that of test product 1-1 with pH 4.5, for which the ethyl lactate concentration had not been adjusted. The test product 1-2 (the present invention product) was also found to have stronger umami in the aftertaste than the control product 1 with pH 4.6, for which the ethyl lactate concentration had not been adjusted. The above results showed that the umami in the aftertaste can be remarkably improved for a soy sauce with a pH of less than 4.6 by allowing a soy sauce with a pH of less than 4.6 to contain ethyl lactate at a concentration of 30 ppm per 1 w/v % of total nitrogen concentration.

Example 2

Effects of Ethyl Lactate for Reducing Acidic Taste

Acetic acid or lactic acid was added to a commercially available koikuchi soy sauce (Kikkoman Corporation; pH 4.8; ethyl lactate concentration per 1 w/v % of total nitrogen concentration: 12 ppm; common salt concentration: 16.0 w/v %) so that soy sauces with pH 4.2 (test products A-1, C-1), soy sauces with pH 4.4 (test products B-1, D-1), and soy sauces with pH 4.6 (control products A to D) were separately prepared. A commercially available ethyl lactate (Tokyo Chemical Industry Co., Ltd.) was added to the test products A-1, B-1, C-1, and D-1 such that the ethyl lactate concentration per 1 w/v % of total nitrogen concentration was adjusted to 30 ppm. Thus, test products A-2, B-2, C-2, and D-2 were obtained. Ethyl lactate was not added to the control products A to D (pH 4.6). The control products A to D were used as control products for the test products with the corresponding alphabetical designations. These test products and control products were subjected to sensory evaluation. The sensory evaluation of the "intensity of acidic taste" was performed by panelists who had been trained to have ability to distinguish such taste (10 panelists for test product A-1, test product A-2, and control product A; 7 panelists for test product B-1, test product B-2, and control product B; 8 panelists for test product C-1, test product C-2, and control product C; and 6 panelists for test product D-1, test product D-2, and control product D). The sensory evaluation results were ranked by points. Points (3 points, 2 points, and 1 point) were given in descending order of the intensity of acidic taste. The results were expressed as the sum of the points. The results were determined to be significant different at a significance level of 5% when the score was "8 to 16, " "10 to 18, " "11 to 21, " and "15 to 25" for 6 panelists, 7 panelists, 8 panelists, and 10 panelists, respectively. Table 2 shows the results.

TABLE 2

| Category | Acidulant | pH | Ethyl lactate concentration per 1 w/v % of total nitrogen concentration (ppm) | Intensity of acidic taste (score) |
| --- | --- | --- | --- | --- |
| Test product A-1 | Acetic acid | 4.2 | 12 | 24 |
| Control product A | Acetic acid | 4.6 | 12 | 11* |
| Test product A-2 | Acetic acid | 4.2 | 30 | 25 |
| Test product B-1 | Acetic acid | 4.4 | 12 | 21* |
| Control product B | Acetic acid | 4.6 | 12 | 10 |
| Test product B-2 (Present invention product) | Acetic acid | 4.4 | 30 | 12 |
| Test product C-1 | Lactic acid | 4.2 | 12 | 10 |
| Control product C | Lactic acid | 4.6 | 12 | 8* |
| Test product C-2 | Lactic acid | 4.2 | 30 | 21 |
| Test product D-1 | Lactic acid | 4.4 | 12 | 17* |
| Control product D | Lactic acid | 4.6 | 12 | 11 |
| Test product D-2 (Present invention product) | Lactic acid | 4.4 | 30 | 8 |

*"Significant different" at a significance level of 5%

The test product A-1 (pH 4.2), the test product B-1 (pH 4.4), the test product C-1 (pH 4.2), and the test product D-1 (pH 4.4), each with a pH that had been lowered with the addition of the acidulant, were found to have stronger acidic taste than the corresponding control products A to D. On the other hand, the intensity of acidic taste of the test products B-2 and D-2 with pH 4.4, which contained ethyl lactate at a concentration of 30 ppm per 1 w/v % of total nitrogen concentration, was significantly reduced compared with that of test products B-1 and D-1 having the same pH (pH 4.4), for which the ethyl lactate concentration had not been adjusted. In addition, the intensity of acidic taste of the test products B-2 and D-2 was lower than or equivalent to that of the control products B and D with pH 4.6, for which the ethyl lactate concentration had not been adjusted. Meanwhile, the intensity of acidic taste of the test products A-2 and C-2 with pH 4.2 which contained ethyl lactate at a concentration of 30 ppm per 1 w/v % of total nitrogen concentration was equivalent to that of the test products A-1 and C-1 with the same pH (pH 4.2), for which the ethyl lactate concentration had not been adjusted. As a result, the effect of reducing acidic taste was not obtained with the addition of ethyl lactate.

Based on the above results, it was determined that the lower limit of pH necessary for obtaining the effect of reducing acidic taste of soy sauce with the addition of ethyl lactate is 4.2 to 4.4.

Example 3

Examination of the Ethyl Lactate Concentration (Lower Limit)

Acetic acid was added to a commercially available koikuchi soy sauce (Kikkoman Corporation; pH 4.8; ethyl lactate concentration per 1 w/v % of total nitrogen concentration: 12 ppm; common salt concentration: 16.0 w/v %) so that a soy sauce with pH 4.5 was prepared as a control product. A commercially available ethyl lactate (Tokyo Chemical Industry Co., Ltd.) was added to the control product such that the ethyl lactate concentration per 1 w/v % of total nitrogen concentration was adjusted to the concentrations listed in Table 3 (20 ppm, 30 ppm, 40 ppm, and 50 ppm). Thus, soy sauces with different ethyl lactate concentrations were prepared as test products for the sensory test.

The test products and the control product were subjected to sensory evaluation performed by 4 panelists who had been trained to have the ability to distinguish between the relevant tastes and odors. The test products were compared with the control product for the evaluation of "acidic odor," "umami in the aftertaste," and "flavor balance." The mean value was obtained in accordance with the evaluation criteria described below. Table 3 shows the results.

<Criteria for the Evaluation of Acidic Odor and Umami in the Aftertaste>
3: The result for the test product was remarkably stronger than that for the control product.
2: The result for the test product was stronger than that for the control product.
1: The result for the test product was relatively stronger than that for the control product.
0: The result for the test product was equivalent to that for the control product.
−1: The result for the test product was relatively weaker than that for the control product.
−2: The result for the test product was weaker than that for the control product.
−3: The result for the test product was remarkably weaker than that for the control product.

<Criteria for the Evaluation of Flavor Balance>
3: The result for the test product was remarkably better than that for the control product.
2: The result for the test product was better than that for the control product.
1: The result for the test product was relatively better than that for the control product.
0: The result for the test product was equivalent to that for the control product.
−1: The result for the test product was relatively worse than that for the control product.
−2: The result for the test product was worse than that for the control product.
−3: The result for the test product was remarkably worse than that for the control product.

TABLE 3

| Ethyl lactate concentration per 1 w/v % of total nitrogen concentration (ppm) | pH | Total nitrogen concentration (w/v %) | Acidic odor | Umami in the aftertaste | Flavor balance |
|---|---|---|---|---|---|
| 12 (control product) | 4.5 | 1.6 | 0 | 0 | 0 |
| 20 | 4.5 | 1.6 | −1 | 0.25 | 1 |
| 30 | 4.5 | 1.6 | −1.25 | 1 | 1.25 |
| 40 | 4.5 | 1.6 | 0 | 0.5 | 0 |
| 50 | 4.5 | 1.6 | 0.5 | 0.25 | 0.5 |

The remarkable effect of reducing "acidic odor" was confirmed when the ethyl lactate concentration per 1 w/v % of total nitrogen concentration was 20 ppm and 30 ppm. The effects of improving "umami in the aftertaste" and "flavor balance" were confirmed for each test product, but remarkable effects were confirmed when the concentration was 30 ppm.

Example 4

Examination of the Ethyl Lactate Concentration (Upper Limit)

Acetic acid was added to a commercially available koikuchi soy sauce (Kikkoman Corporation; pH 4.8; ethyl lactate concentration per 1 w/v % of total nitrogen concentration: 12 ppm; common salt concentration: 16.0 w/v %) so that a soy sauce with pH 4.5 was prepared as a control product. A commercially available ethyl lactate (Tokyo Chemical Industry Co., Ltd.) was added to the control product such that the ethyl lactate concentration per 1 w/v % of total nitrogen concentration was adjusted to the concentrations listed in Table 4 (20 ppm, 30 ppm, 50 ppm, 70 ppm, and 100 ppm). Thus, soy sauces with different ethyl lactate concentrations were prepared as test products for the sensory test.

The test products and the control product were subjected to the sensory evaluation performed by 14 panelists who had been trained to have the ability to distinguish the relevant odor. The test was conducted using a triangle sensory test. The test products containing ethyl lactate were compared with the control product to evaluate a "medicinal odor" (peppermint-like odor) that is particular to ethyl lactate. The triangle sensory test is intended to examine whether a test product can be distinguished from among a set of three samples (two control product samples and one test product sample). Further, the presence or absence of significant difference was examined in accordance with the hypothesis test using the probability of obtaining an accidental correct answer and a significant level of 5% in statics. Table 4 shows the results. Note that the column "Distinguished (by panelists)" in Table 4 represents the number of panelists out of 14 panelists who evaluated the test product sample as "having medicinal odor" upon evaluation.

TABLE 4

| Ethyl lactate concentration | Acetic acid | | Lactic acid | |
|---|---|---|---|---|
| (ppm/total nitrogen concentration) | Distinguished (by panelists) | Evaluation | Distinguished (by panelists) | Evaluation |
| 20 | 8 | — | 8 | — |
| 30 | 6 | — | 4 | — |
| 50 | 7 | — | 3 | — |
| 70 | 6 | — | 9 | * |
| 100 | 10 | * | 9 | * |

—: No significant difference
* "Significant different" at a significance level of 5%

More than a half of the panelists distinguished, as products having the medicinal odor, the test products that contained ethyl lactate at concentrations of more than 70 ppm per 1 w/v % of total nitrogen concentration. It was revealed that the original soy sauce flavor had been lost. Based on the above results, it was determined that the upper limit of ethyl lactate concentration per 1 w/v % of total nitrogen concentration is 70 ppm, and preferably 50 ppm.

Example 5

Examination of the Relationship Between the Effect of Ethyl Lactate for Improving Umami in the Aftertaste and Common Salt Concentration A commercially available koikuchi soy sauce (Kikkoman Corporation; pH 4.8; ethyl lactate concentration per 1 w/v % of total nitrogen concentration: 12 ppm; common salt concentration: 16.0 w/v %) was desalted using an ion-exchange membrane. Then, acetic acid was added to adjust pH to 4.5. Further, the concentration of sodium chloride was adjusted to the concentrations listed in Table 5 (8 w/v %, 12 w/v %, 16 w/v %, 18 w/v %, 20 w/v %). Thus, control products were obtained. A commercially available ethyl lactate (Tokyo Chemical Industry Co., Ltd.) was added to the control products such that the ethyl lactate concentration per 1 w/v % of total nitrogen concentration was adjusted to 30 ppm. Thus, soy sauces with different common salt concentrations were prepared as test products for the sensory test.

The test products and the control products were subjected to the sensory evaluation performed by 6 panelists who had been trained to have the ability to distinguish the relevant taste. The test was conducted to compare the test products with control products having the same common salt concentrations for the evaluation of "umami in the aftertaste." The mean value was obtained in accordance with the evaluation criteria described below. Table 5 shows the results.

<Criteria for Evaluation of Umami in the Aftertaste>
3: The result for the test product was remarkably stronger than that for the control product.
2: The result for the test product was stronger than that for the control product.
1: The result for the test product was relatively stronger than that for the control product.
0: The result for the test product was equivalent to that for the control product.
−1: The result for the test product was relatively weaker than that for the control product.
−2: The result for the test product was weaker than that for the control product.
−3: The result for the test product was remarkably weaker than that for the control product.

TABLE 5

| Common salt concentration (w/v %) | Ethyl lactate concentration per 1 w/v % of total nitrogen concentration (ppm) | pH | Umami in the aftertaste |
|---|---|---|---|
| 8 | 30 | 4.5 | 0 |
| 12 | 30 | 4.5 | 0.6 |

TABLE 5-continued

| Common salt concentration (w/v %) | Ethyl lactate concentration per 1 w/v % of total nitrogen concentration (ppm) | pH | Umami in the aftertaste |
|---|---|---|---|
| 16 | 30 | 4.5 | 0.6 |
| 18 | 30 | 4.5 | 0.3 |
| 20 | 30 | 4.5 | −0.1 |

The effect of ethyl lactate for improving "aftertaste umami" was obtained when the common salt concentration was 12 to 18 w/v %.

INDUSTRIAL APPLICABILITY

The present invention can be used in the field of producing soy sauces, condiments containing soy sauce, and the like.

All publications, patents, and patent applications cited herein are incorporated herein by reference in their entirety.

The invention claimed is:

1. A soy sauce, comprising from 20 ppm to 50 ppm of ethyl lactate per 1 w/v % of total nitrogen concentration in the soy sauce and having a pH of more than 4.2 to less than 4.6.

2. The soy sauce of according to claim 1, having a common salt concentration of from 12 to 18 w/v % in the soy sauce.

3. The soy sauce according to claim 1, compromising from 20 ppm to 30 ppm of ethyl lactate per 1 w/v % of a total nitrogen concentration in the soy sauce.

4. The soy sauce according to claim 1, wherein the soy sauce is at least one selected from the group consisting of a koikuchi dark-colored soy sauce, usukuchi light-colored soy sauce, tamari rich-tasting soy sauce, saishikomi refermented soy sauce, and white soy sauce.

* * * * *